(12) United States Patent
Hirayama et al.

(10) Patent No.: US 9,098,779 B2
(45) Date of Patent: Aug. 4, 2015

(54) RECORDING CONTROL DEVICE, CONTROL METHOD, AND PROGRAM

(75) Inventors: Hisashi Hirayama, Ueda (JP); Hiroyuki Nagasawa, Ueda (JP); Yasuhiro Takeuchi, Sakaki-machi (JP); Nobuhiko Nishimura, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 1222 days.

(21) Appl. No.: 12/948,350

(22) Filed: Nov. 17, 2010

(65) Prior Publication Data

US 2011/0122429 A1   May 26, 2011

(30) Foreign Application Priority Data

Nov. 20, 2009   (JP) .................... 2009-264594

(51) Int. Cl.
*G06F 15/00* (2006.01)
*G06K 1/00* (2006.01)
*G06K 15/02* (2006.01)
*G06F 3/12* (2006.01)

(52) U.S. Cl.
CPC .............. *G06K 15/02* (2013.01); *G06F 3/1208* (2013.01); *G06F 3/1232* (2013.01); *G06F 3/1257* (2013.01); *G06F 3/1285* (2013.01)

(58) Field of Classification Search
CPC ..... G06K 15/02; G06F 3/1208; G06F 3/1232; G06F 3/1257; G06F 3/1285
USPC ......................................... 358/1.1, 1.11, 1.13
See application file for complete search history.

(56) References Cited

U.S. PATENT DOCUMENTS

| | | | |
|---|---|---|---|
| 5,825,987 A | 10/1998 | Asada | |
| 7,057,617 B1 * | 6/2006 | Nishida | ............... 345/472 |
| 2007/0019219 A1 * | 1/2007 | Takayama | ............ 358/1.11 |
| 2008/0259398 A1 | 10/2008 | Osuka et al. | |
| 2008/0304092 A1 | 12/2008 | Ebuchi | |

FOREIGN PATENT DOCUMENTS

| | | |
|---|---|---|
| JP | H09-30061 A | 2/1997 |
| JP | 2002014786 A | 1/2002 |
| JP | 2006260089 A | 9/2006 |
| JP | 2008077228 A | 4/2008 |
| JP | 2008269265 A | 11/2008 |
| JP | 2008305298 A | 12/2008 |

* cited by examiner

*Primary Examiner* — Douglas Tran
(74) *Attorney, Agent, or Firm* — Nutter McClennen & Fish LLP; John J. Penny, Jr.

(57) ABSTRACT

A host computer is connected to a printer that prints text according to settings specifying a text printing format. Using a function of a driver setup program, the host computer acquires a file set including an MOT file (recording device settings data) and a corresponding INF file (control device settings data) that are configured to produce the same or substantially the same printout as a printer with different printing format specifications, and configures settings stored in a registry that is referenced by a printer driver based on the acquired INF file. Using a function of a firmware setup program, the host computer generates or updates settings based on the MOT file.

7 Claims, 7 Drawing Sheets

| SETTINGS DATA (SETTINGS FILE, INF FILE) | | ~27 |
|---|---|---|
| FONT SIZE | 12x24 (dot) | |
| CHARACTER SPACING | 2 (dot) | |
| LINE SPACING | 6 (dot) | |
| PAPER SIZE | 80 mm | |
| MARGIN | RIGHT 5 mm, LEFT 5 mm | |

FIG. 3A

| SETTINGS DATA (SETTINGS FILE, MOT FILE) | | ~28 |
|---|---|---|
| FONT DATA | 12x24 (dot) | |

FIG. 3B

| | PRINT RESOLUTION | PAPER SIZE | HORIZONTAL DOT COUNT | NO. COLUMNS (12x24) | NO. COLUMNS (11x22) | NO. COLUMNS (6x12) |
|---|---|---|---|---|---|---|
| EXAMPLE 1 | 180 dpi | 80 mm | 512 | 42 | 46 | — |
| EXAMPLE 2 | 203 dpi | 80 mm | 576 | 46 | — | — |
| EXAMPLE 3 | 96 dpi | 80 mm | 276 | — | — | 46 |
| EXAMPLE 4 | 203 dpi | 58 mm | 418 | 34 | 38 | — |
| EXAMPLE 5 | 180 dpi | 58 mm | 374 | — | 34 | — |

FIG. 4

| FONT DATA | | | | |
|---|---|---|---|---|
| FONT NAME | VERTICAL SIZE (DOTS) | HORIZONTAL SIZE (DOTS) | VERTICAL MULTIPLE | HORIZONTAL MULTIPLE |
| FontA11 | 8 | 12 | — | — |
| FontA12 | 8 | 24 | 1 | 2 |
| FontA21 | 16 | 12 | 2 | 1 |
| FontA22 | 16 | 24 | 2 | 2 |
| FontA** | ** | ** | ** | ** |

| FONT DATA | | | | |
|---|---|---|---|---|
| FONT NAME | VERTICAL SIZE (DOTS) | HORIZONTAL SIZE (DOTS) | VERTICAL MULTIPLE | HORIZONTAL MULTIPLE |
| FontA11 | 10 | 10 | — | — |
| FontA12 | 10 | 20 | 1 | 2 |
| FontA21 | 20 | 10 | 2 | 1 |
| FontA22 | 20 | 20 | 2 | 2 |
| FontA** | ** | ** | ** | ** |

RECORDING CONTROL DEVICE, CONTROL METHOD, AND PROGRAM

BACKGROUND

1. Technical Field

The present invention relates to a recording control device connected to a recording device that records on a recording medium, to a control method for this recording control device, and to a program.

2. Related Art

A driver program for the recording device to be controlled is typically installed on a computer or other control device that controls the recording device. See, for example, Japanese Unexamined Patent Appl. Pub. JP-A-2008-077228. The driver program is configured according to a configuration or setup file when installed, and controls the recording device to record according to the configured settings. As taught in Japanese Unexamined Patent Appl. Pub. JP-A-2002-014786, one of the parameters that may be configured during this setup process is the size of the characters recorded by the recording device, for example.

Information such as the character size that is set in the control device must, however, reflect the character size that is actually recorded by the recording device, and when a recording device that can change the recording (print) resolution or character size, for example, is used, the recording device and the control device settings may not match.

More particularly, if the same or substantially the same printout is to be achieved using plural recording devices that record at different print resolutions, the print resolution and dot size of the characters must be appropriately set in each of the recording devices, but a mismatch can easily occur between the settings of the recording devices and the control device.

SUMMARY

The present invention enables easily and reliably matching recording device settings related to the text recording format with the text recording format of the control device that controls the recording device.

A first aspect of the invention, is a recording control device that is connected to a recording device that stores recording format information specifying a text recording format and records text according to the recording format information, the recording control device including a control unit that controls a recording operation of the recording device; a configuration unit that configures settings that are related to the text recording format of the recording device and are used by the control unit to control the recording device; and a storage unit that stores at least one set of recording device settings data and control device settings data correlated to obtain the same or substantially the same recording result as a recording device with different text recording format specifications; wherein the configuration unit acquires the recording device settings data and the control device settings data from the storage unit, configures the control unit settings based on the acquired control device settings data, and generates or updates the recording format information of the recording device based on the recording device settings data.

In order to configure the recording format information such as settings stored by the recording device, and the recording control device that controls the recording device, at least one data set including recording device settings data and control device settings data that are correlated to each other to achieve a recording result that is the same or substantially the same as the recording result produced by a recording device with different specifications related to the text recording format is used. As a result, content can be recorded with the same or substantially the same appearance as when a recording device with different specifications is used, and a mismatch in the settings of the recording device and the recording control device can be prevented.

In a recording control device according to another aspect of the invention, the mutually corresponding recording device settings data and control device settings data both contain information specifying the size of text recorded by the recording device, and the configuration unit sets the character size recorded by the recording device for the control unit.

This aspect of the invention can prevent a mismatch in the character size settings in the recording device and the recording control device, and enables producing a recording result with the appearance specified by the recording control device.

In a recording control device according to another aspect of the invention, the recording device is a device chat records characters composed of a plurality of dots by forming dots on a recording medium; the recording device settings data and the control device settings data include information specifying a recording dot size of the characters so chat the recording device can record text with the same or substantially the same arrangement as a separate recording device with a different recording resolution; and the configuration unit sets for the control unit the recording dot size of characters recorded by the recording device, or a character size obtained from the recording resolution of the recording device and the recording dot size of the characters.

This aspect of the invention enables recording text in the same way as when the text is recorded by a recording device having a different recording resolution, and producing a recording result that looks the same.

Further preferably in a recording control device according to another aspect of the invention, the control unit generates a print job for recording at the character size set by the configuration unit based on the operation of an application program.

Because the control unit is configured with the same recording format information stored in the recording device and generates a recording job when information is recorded by the operation of an application program, this aspect of the invention can record according to the recording result anticipated by the application program.

Another aspect of the invention is a control method that controls a recording control device, which is connected to a recording device that stores recording format information specifying a text recording format and records text according to the recording format information, and includes a control unit that controls a recording operation of the recording device. The control method includes steps of: acquiring settings data that is correlated to obtain the same or substantially the same recording result as a recording device with different text recording format specifications; configuring settings that are related to the text recording format of the recording device and are used by the control unit to control the recording device based on the settings data; and generating or updating the recording format information of the recording device based on the acquired settings data.

In order to configure the recording format information stored by the recording device, and the recording control device that controls the recording device, settings data that is correlated to achieve a recording result that is the same or substantially the same as the recording result produced by a recording device with different specifications related to the text recording format is used. As a result, content can be recorded with the same or substantially the same appearance as when a recording device with different specifications is used, and a mismatch in the settings of the recording device and the recording control device can be prevented.

Another aspect of the invention is a program that is executed by a control device that is connected to a recording device that stores recording format information specifying a text recording format and records text according to the recording format information, and includes a control unit that controls a recording operation of the recording device. The program includes steps of: acquiring settings data correlated to obtain the same or substantially the same recording result as a recording device with different text recording format specifications; configuring settings that are related to the text recording format of the recording device and are used by the control unit to control the recording device based on the settings data; and generating or updating the recording format information of the recording device based on the acquired settings data.

As a result of the control device running this program, settings data that is correlated to achieve a recording resale chat is the same or substantially the same as the recording result produced by a recording device with different specifications related to the text recording format is used to configure the recording format information stored by the recording device, and the recording control device that controls the recording device. As a result, content can be recorded with the same or substantially the same appearance as when a recording device with different specifications is used, and a mismatch in the settings of the recording device and the recording control device can be prevented.

Effect of the Invention

Content can be recorded with the same or substantially the same appearance as the recording result produced by a recording device of different specifications, and a mismatch between the settings of the recording device and the recording control device can be prevented.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 3A and 3B schematically describe the content of a configuration file.

FIG. 4 is a table showing an example of the relationship between printer resolution, character size, and number of columns.

DESCRIPTION OF EMBODIMENTS

A preferred embodiment of the present invention is described below with reference to the accompanying figures.

Figure 1:
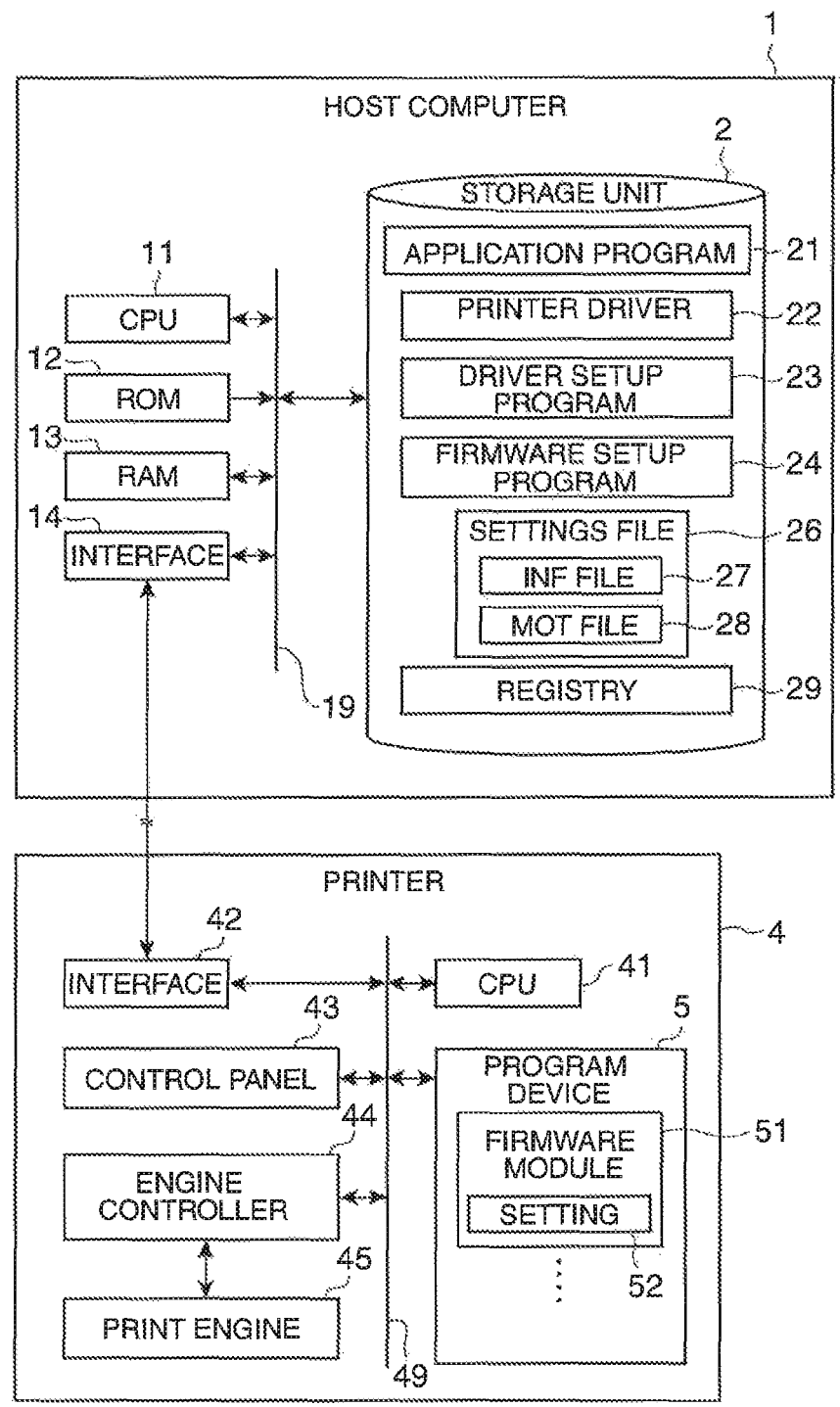
FIG. 1 is a block diagram showing the configuration of a printing system according to a preferred embodiment of the invention.

FIG. 1 is a block diagram showing the configuration of a printing system 100 according to a preferred embodiment of the invention.

As shown in FIG. 1, the printing system 100 includes a host computer 1 and a printer 4 that is communicably connected to the host computer 1.

The host computer 1 is, for example, a POS terminal device that is installed at a checkout counter in a retail store and is part of a point-of-sale system (POS system) that processes sales transactions, and prints (records) a receipt by means of a printer 4 for each transaction. Note that the host computer 1 typically includes a display that displays the content of the purchased products and transaction process, a barcode scanner that reads barcodes affixed to the products during the sales transaction, an input unit including an enter key to finalize a transaction, and a cash drawer that stores cash for payments, but these devices are omitted in the figures and following description.

The host computer 1 functions as a recording control device and includes a CPU 11 that executes programs, ROM 12 that stores a basic control program executed by the CPU 11, RAM 13 that is used as work mg memory for temporarily storing processed data and programs executed by the CPU 11, an interface 14 that is connected to the printer 4 by wire or wirelessly and communicates control commands and data with the printer 4 according to a specified communication protocol, a storage unit 2 rendered by a magnetic or optical storage device that nonvolatilely stores information and stores programs and data, and a bus 19 through which these other devices are connected to each other.

Programs executed by the CPU 11 and stored in the storage unit 2 include application program 21 enabling the POS system to execute a sale registration process and payment process (a transaction process), a printer driver 22 that controls the printer 4 to print, a driver setup program 23 for configuring various settings related to the operation of the printer driver 22, and a firmware setup program 24 for configuring various printer 4 settings.

A settings file 26 is also stored in the storage unit 2. This settings file 26 includes an INF file 27 (control device settings data) containing data that is used when executing the driver setup program 23, and an MOT file 28 (recording device settings data) containing data that is used when executing the firmware setup program 24.

A registry 29 is also stored in the storage unit 2. The registry 29 stores set tings related to the basic operation of the host computer 1, and includes data related to the print format that is referenced when the printer driver 22 executes.

The printer 4 that functions as a recording device outputs a receipt for each sale transaction as controlled by the host computer 1. The printer 4 in this embodiment of the invention is a thermal line printer that conveys thermal roll paper, which is thermal printing paper wound into a roll, by means of a platen roller (not shown in the figure), and prints (records) monochrome or color text and images by applying heat to the recording surface of the thermal roll paper by means of a line thermal head (not shown in the figure) that has a heating element.

The printer 4 includes a CPU 41 that controls various parts of the printer 4 by executing a control program; an interface 42 that is connected by wire or wirelessly to the host computer 1, and communicates control commands and data with the host computer 1 according to a specified communication protocol; a control panel 43 including a display (not shown in the figure) with LEDs that display the operating status of the printer 4, for example, and an operating unit (not shown in the figure) for configuring settings related to the operation of the printer 4; a print engine 45 that prints on the thermal roll paper using other parts of the printer including the foregoing line thermal head and platen; an engine controller 44 that controls the print engine 45 to print text and images based on the text and image data input from the CPU 41; a program device 5 rendered by rewritable nonvolatile memory such as flash memory; and a bus 49 through which these various parts are connected to each other.

The program device 5 stores a firmware module 51 as a control program executed by the CPU 41. The firmware module 51 is an executable program that can be executed by the CPU 41, and the settings 52 (recording format information) that are referenced when this program is executed is stored with the firmware module 51. The settings 52 may be included as part of the firmware module 51, or they may be stored with the firmware module 51 in the program device 5.

The firmware module 51 is a software module containing one or more functions of the printer 4. A plurality of firmware modules 51 are stored in the program device 5, and the CPU 41 loads and executes the firmware module 51 corresponding to the command received from the host computer 1 from the program device 5.

Figure 2A:
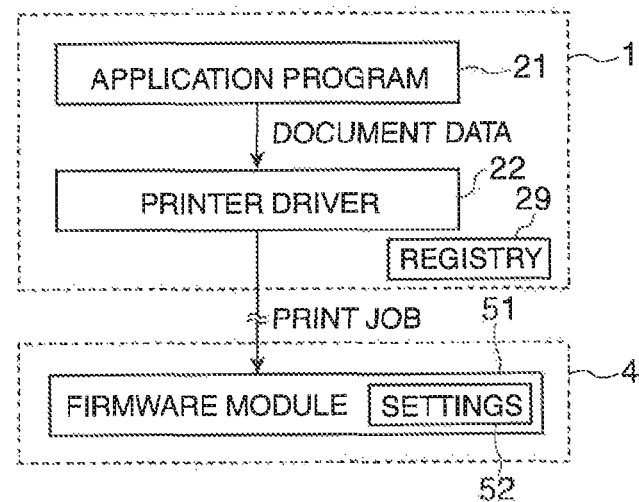
FIGS. 2A and 2B are block diagrams schematically describing the operation sequence of the printing system.
Figure 2B:
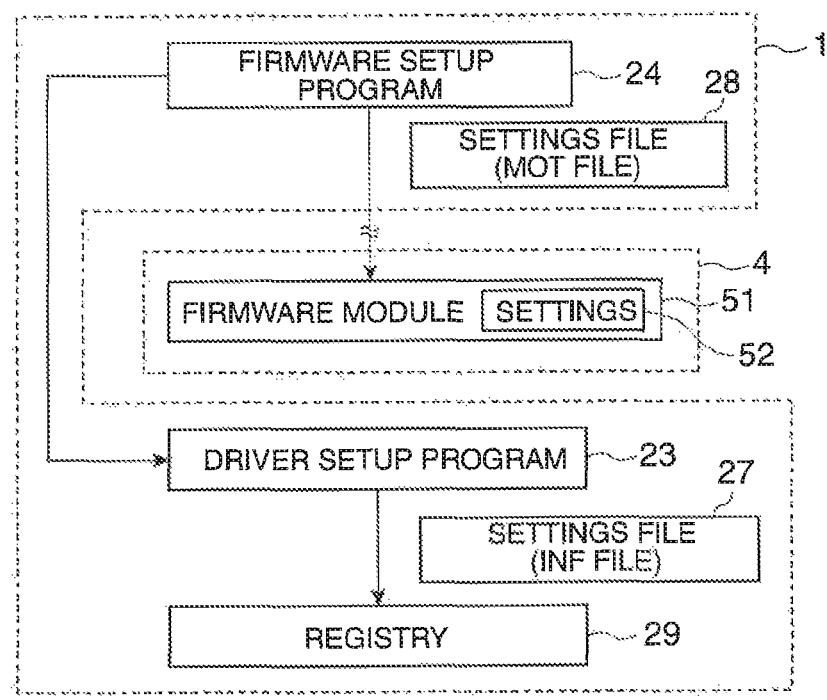

FIGS. 2A and 2B schematically describes the operating sequence of the printing system 100. FIG. 2A shows the operation when printing and FIG. 2B shows the operation during setup.

As shown in FIG. 2A, the CPU 11 of the host computer 1 renders the functions of a POS terminal device by loading and executing the application program 21 stored in the storage unit 2.

When printing becomes necessary while executing the application program 21, the CPU 11 produces document data including the text and images to be printed by a function of the application program 21, generates and sends to the printer 4 a print job including the data to be printed and control commands for controlling the printer 4 based on this document data by a function of the printer driver 22.

The printer driver 22 references the registry 29 that is preconfigured based on the IN file 27, arranges text and other print objects according to the printer 4 settings, which include the character spacing, line spacing, paper size, and margins, stored in the registry 29, and generates a print job including commands specifying the character spacing, line spacing, and margins for printing according to this arrangement.

The printer 4 receives and interprets print jobs sent from the host computer 1, and prints by executing a firmware module 51 based on the control commands and controlling the engine controller 44.

When running the printer driver 22 the CPU 11 functions as a control unit.

The settings in the registry 29 that are referenced by the printer driver 22 when creating a print job must match the character size that is actually set in the printer 4, the character spacing, line spacing, and margins that can be used on the printer 4, and the paper size set in the printer 4. If these settings differ from the actual printer 4 setup, the appearance of the printout from the printer 4 will differ from the intended printout of the print job generated by the printer driver 22. The printing system 100 according to this embodiment of the invention therefore configures these settings using the settings file 26.

FIGS. 3A and 3B schematically describes the structure of the settings file 26 stored in the storage unit 2. FIG. 3A shows the structure of the INF file 27, and FIG. 3B shows the structure of the MOT file 28.

As shown in FIG. 3A, the INF file 27 includes parameters related to the print format when the printer 4 prints text. More specifically, the INF file 27 includes the font size, which indicates the character size expressed by the number of dots vertically and horizontally; the character spacing, which describes the size of the white space between one character and another character expressed as a number of dots; the line spacing, which describes the width (height) of the white space between one line and another line expressed as a number of dots; the paper size, which describes the width of the thermal roll paper used in the printer 4; and the margin, which describes the width of the non-printed area (margin) disposed at both ends of the thermal roll paper.

As shown in FIG. 3B, the MOT file 28 contains a value denoting the same font size as in the INF file 27 as a value related to the print format when the printer 4 prints text, and includes the actual data (font data) of a font, such as A and B. The values in the MOT file 28 are set in the settings 52 of the printer 4 (see FIG. 1) and the firmware module 51 prints text using the font data contained in the settings 52.

The INF file 27 shown in FIG. 3A and the MOT file 28 shown in FIG. 3B are related to each other, and a different combination of INF file 27 and MOT file 28 that breaks this relationship is not used. For example, the same identifier may be assigned to the INF file 27 and MOT file 28, and whether the INF file 27 and MOT file 28 are related to each other can be determined by determining if the identifiers assigned to each file match or not. In FIG. 3 the files both relate to a 12×24 dot font.

The INF file 27 and MOT file 28 are used during the setup sequence shown in FIG. 2B.

During this setup sequence the CPU 11 loads and executes the firmware setup program 24, reads the MOT file 28 of the settings file 26, and sets the values contained in the MOT file 28 (the character size and font data in this embodiment of the invention) in the settings 52 of the printer 4. The settings 52 as used here are recording format information.

When the CPU 11 loads and executes the firmware setup program 24, the driver setup program 23 is called by a function of the firmware setup program 24. More specifically, the firmware setup program 24 is basically not executed alone, and the driver setup program 23 is also executed when the firmware setup program 24 executes.

The CPU 11 references the INF file 27 by means of a function of the driver setup program 23, and sets the settings in the INF file 27 in the registry 29 that is referenced by the printer driver 22. The printer driver 22 thus produces a print job according to the values in the INF file 27.

The values of the INF file 27 set in the registry 29 are also written to the settings 52 of the printer 4 based on the MOT file 28 linked the INF file 27. As a result, the settings in the registry 29 and the printer 4 settings 52 always match, and the desired printout can be achieved.

The CPU 11 functions as a setup unit during execution of the driver setup program 23 and the firmware setup program 24.

Furthermore, because the INF file 27 and MOT file 28 include settings that depend upon the type or model of printer 4, the printer driver 22 and printer 4 that can use the INF file 27 and MOT file 28 are limited. The possibility of an incompatible settings file 26 being stored in the storage unit 2 is generally low, and the operator of the printing system 100 may confirm if the correct settings file 26 is stored, but a configuration in which the host computer 1 automatically checks the compatibility of the settings file 26 is also conceivable. More specifically, the driver setup program 23 and firmware setup program 24 can be written to include a function for determining whether or not the INF file 27 and MOT file 28 are compatible with the printer driver 22 to be configured and the type or model of printer 4 in which the firmware module 51 is used.

The purpose and benefits of setting the character size and other parameters by means of the settings file 26 are described next.

FIG. 4 is a table showing an example of the relationship between print resolution, character size, and number of columns.

As shown in example 1 in FIG. 4, when a printer with a print resolution of 180 dpi (dots per inch) uses thermal roll paper that is 80 mm wide, 512 dots can be printed on one line. When a font that is 12 dots wide by 24 dots high (referred to simply below as 12×24 does) is printed, 42 characters can be printed on one line, and when a font that is 11 dots wide by 22 dots high is printed, 46 characters can be printed on one line.

When a printer with a print resolution of 203 dpi uses thermal roll paper that is 80 mm wide as shown in example 2, 576 dots can be printed on one line. If the printer according to this second example uses a font that is 12 dots wide by 24 dots high, 46 characters can be printed on one line.

If printout that looks identical to the result output by the 203-dpi printer shown in example 2 is to be output by the printer in example 1, a printout with the same or substantially the same appearance can be achieved by setting the number of columns per line to the same value. In this example this can be achieved by changing the font that is used by the printer in example 1 from a 1.2×24 dot font to an 11×22 dot font.

Furthermore, if the same output produced by the printer in example 2 is to be printed by a 96-dpi printer as shown in example 3, a printout with the same or substantially the same appearance can be achieved by setting the font used by the printer in example 3 to a 6×12 dot font because 46 characters can then be printed on one line.

The print resolution of a printer is normally determined by the printer model, and the print resolution of the printer 4 cannot be changed in this embodiment of the invention. In this embodiment of the invention the INF file 27 and MOT file 28 of the settings file 26 are data for setting the character size and font data according to the print resolution of the printer 4 so that printout that is the same or similar to that produced by a different printer model with a different print resolution can be achieved. For example, so that the same result printed by the 203-dpi printer shown in example 2 can be obtained from the 180-dpi printer shown in example 1, the character size and font data of the 180-dpi printer in example 1 are updated or generated at 11×22 dots.

Furthermore, because the same setting is stored in the registry 29 using the INF file 27 corresponding to this MOT file 28, there will be no difference between the printer 4 file settings and the host computer 1 settings.

Figure 5:
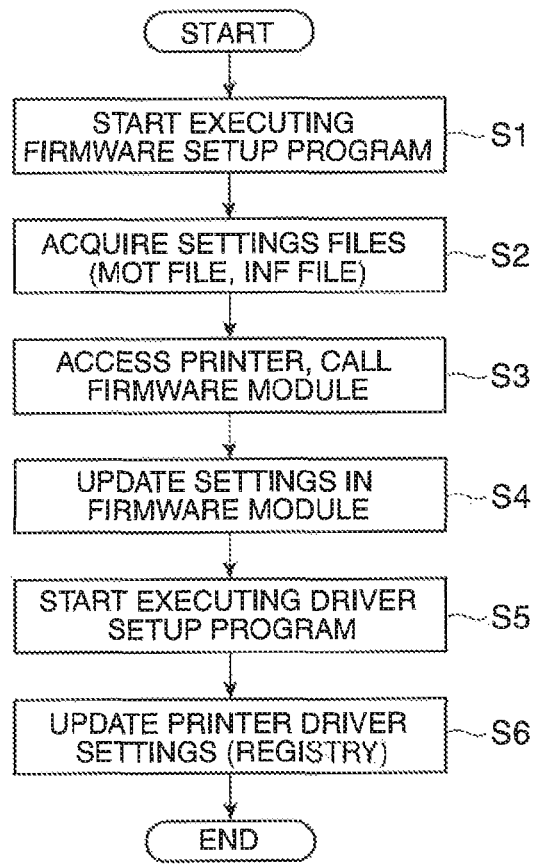
FIG. 5 is at low chart showing the operation of the host computer.

FIG. 5 is a flow chart describing the operation of the host computer 1.

When the firmware setup program 24 is called by operating an input unit not shown, the CPU 11 of the host computer 1 starts loading and executing the firmware setup program 24 from the storage unit 2 (step S1). The CPU 11 then reads the settings file 26, that is, the INF file 27 and MOT file 28 and set, specified by operating the input unit not shown from among the settings files 26 stored in the storage unit 2 (step S2).

The CPU 11 sends a control command through the interface 14 to the printer 4, and calls the firmware module 51 stored in the program device 5 of the printer 4 (step S3). The CPU 41 of the printer 4 reads the firmware module 51 in this step S3.

The CPU 11 sends a control command to update the settings 52 referenced by the firmware module 51 and the data extracted from the MOT file 28 to the printer 4, and causes the firmware module 51 (settings 52) to be undated or generated (step S4). The CPU 41 updates the values of the settings 52 according to the received data and stores the updated settings 52 in the program device 5 according to a control command received from the host computer 1.

The CPU 11 then loads and starts executing the driver setup program 23 (step S5). The CPU 11 extracts the data to be set from the IN file 27 acquired in step S2, and based on this data updates the settings in the registry 29 referenced by the printer driver 22 (step S6).

After thus configuring the registry 29 and settings 52 based on the settings file 26, the host computer 1 can check whether or not a matching INF file 27 and MOT file 28 set was used.

Figure 6:
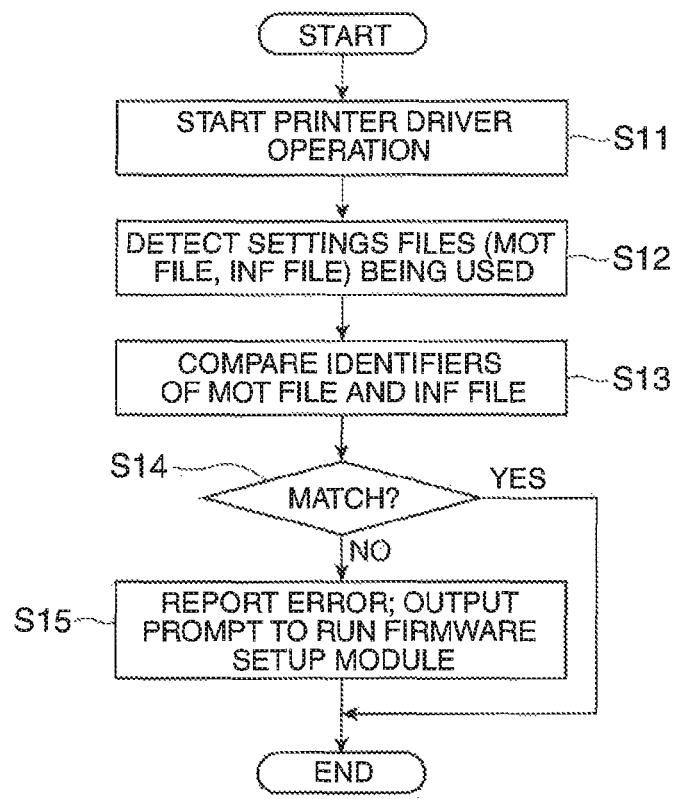
FIG. 6 is a flowchart showing the operation of the host computer.

FIG. 6 is a flow chart showing the operation of the host computer 1 when executing the printer driver 22.

As shown in FIG. 6, the CPU 11 of the host computer 1 loads and executes the printer driver 22 when a print command is asserted by the application program 21 (step S11). The CPU 11 then detects the INF file 27 that is the source of the settings in the registry 29, and the MOT file 28 that was used to set the printer 4 settings 52 (step S12). These files can be detected by, for example, searching the INF files 27 and MOT files 28 stored in the storage unit 2 to find the INF file 27 and MOT file 28 that match the current setting; storing the identifier of the INF file 27 and MOT file 28 that were used during the configuration process when the driver setup program 23 and firmware setup program 24 were executed in the registry 29; or storing information identifying the INF file 27 and MOT file 28 used for configuration with the INF file 27 and MOT file 28 in the storage unit 2.

The CPU 11 then compares the identifiers of the detected INF file 27 and MOT file 28 (step S13) and determines if the identifiers match (step S14). If the identifiers of the INF file 27 and MOT file 28 do not match (step S14 returns No), the CPU 11 reports an error by, for example, displaying a message on a display not shown, outputs a message prompting execution of the firmware setup program 24 (step S15), ends this process, and proceeds with the normal operation of the printer driver 22.

If the identifiers of the INF file 27 and MOT file 28 do match (step S14 returns Yes), the CPU 11 ends this process and proceeds with the normal operation of the printer driver 22.

If a INF file 27 and MOT file 28 that do not correspond to each other are used and values that do not match are set in the printer driver 22 and firmware module 51, this process detects the mismatch before printing starts and notifies the user.

Changing the settings 52 is effective not only in printers 4 that use a single character size, but also in printers 4 that print plural character sizes.

Figures 7A, 7B:
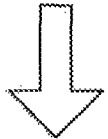
FIGS. 7A and 7B show a specific example of the character size settings.

FIGS. 7A and 7B describes a specific example of setting the character size. FIG. 7A and FIG. 7B show the content of the font-related settings 52 of the printer 4, FIG. 7A showing the settings before updating and FIG. 7B showing the settings after updating.

The printer 4 shown in the example in FIGS. 7A and 7B can print four or more character sizes. This printer 4 generates four or more fonts on the fly by expanding or contracting a single font (font data), and uses these fonts selectively.

In the example in FIG. 7A, FontA11 is used when printing in the base character size. FontA12 doubles the horizontal size of the base font FontA11, FontA21 doubles the vertical size of the base font FontA11, and FontA22 doubles both the horizontal size and the vertical size of the base font FontA11. These multiples are shown in FIG. 7A as the "vertical multiple" and the "horizontal multiple."

Using one base font, the firmware setup program 24 thus changes the size of the base font FontA11 based on the MOT file 28 for a printer 4 that can use plural fonts of different character sizes.

For example, if the size of FontA11 is changed from 8×12 dots to 10×10 dots as shown in FIG. 7B, the other fonts FontA12, FontA21, and FontA22 that are generated from FontA11 are changed by the same proportions.

In the example shown in FIG. 7A and FIG. 7B, in order to print with the same appearance on another printer with a different print resolution, the character size can be changed proportionally to the difference in print resolution by changing the character size of the base font FontA11. Furthermore, because the sizes of other fonts FontA12, FontA21, and FontA22 of different sizes are changed according to the change in the size of the base font FontA11, all fonts ultimately correspond to the different print resolution. These changes are also reflected in the INF file 27 and MOT file 28. The settings can thus be easily changed in a printer 4 that uses fonts of plural sizes so that printout with the same appearance as the printout from a printer with a different print resolution can be achieved by using the firmware setup program 24 to change the settings 52.

As described above, in a printing system 100 according to this embodiment of the invention, the host computer 1 is connected to a printer 4 that stores settings 52 specifying font data and font definition information such as the character size as the text printing format. The host computer 1 has a printer driver 22 that controls the printing operation of the printer 4, and a driver setup program 23 and firmware setup program 24 that set the text printing format of the printer 4 used by the printer driver 22 to control the printer 4. Using a function of the driver setup program 23, the host computer 1 acquires a matching MOT file 28 and INF file 27 set that enable producing the same or substantially the same printout as a printer 4 with a different print resolution, which is one definition related to the text printing format, and configures settings in the registry 29 that is referenced by the printer driver 22 based on the acquired INF file 27. Using a function of the firmware setup program 24, the host computer 1 creates or updates the settings 52 based on the MOT file 28.

This configuration enables setting the settings 52 stored in a printer 4 and the registry 29 referenced by the printer driver 22 that controls the printer 4 using a matching MOT file 28 and INF file 27 set that are correlated to produce the same or substantially the same print result as a printer with a different print resolution. As a result, printing with the same or substantially the same appearance as a printer with different specifications is possible, and a mismatch between the settings of the printer 4 and the host computer 1 can be prevented.

Furthermore, because the matching INF file 27 and MOT file 28 both contain information specifying the size of the characters printed by the printer 4, and the driver setup program 23 and firmware setup program 24 set the character size printed by the printer 4, a mismatch between the character size settings of the printer 4 and the host computer 1 can be prevented, and a printout with the appearance specified by the host computer 1 can be obtained.

Furthermore, the printer 4 is a printer that prints text rendered by a plurality of dots by forming dots on thermal roll paper, the INF file 27 and MOT file 28 contain information specifying the dot size of the characters enabling the printer 4 to print text that looks the same or substantially the same when printed on a printer with a different print resolution, and the driver setup program 23 sets for the printer driver 22 the dot size of the characters printed by the printer 4 or the character size derived from the print resolution of the printer 4 and the dot size of the characters. This enables aligning text in the same way and producing a printout with the same appearance as when the same content is printed on a printer with a different print resolution.

In addition, because the printer driver 22 generates a print job for printing at the character size set in the registry 29 based on the operation of the application program 21, the printout intended by the application program 21 can be printed.

It will be obvious to one with ordinary skill in the related art that that the invention is not limited to the embodiment described above and can be varied in many ways. For example, a configuration in which the function of updating the firmware module 51 and settings 52 in the embodiment described above is rendered by the firmware setup program 24 executed by the host computer 1, and a configuration in which the firmware module 51 and settings 52 are updated by a firmware maintenance program of the printer 4 in addition to this function, are also conceivable. Configurations in which the firmware module 51 is updated by a separate device or a program that is executed by the CPU 41 of the printer 4 are also conceivable.

The program device 5 in the foregoing embodiment is rendered by rewritable nonvolatile memory, such as by flash memory, but is not limited thereto and may be rendered using a different type of rewritable recording medium, such as a hard disk drive, which is a type of rewritable nonvolatile memory, or by RAM, which is a type of rewritable memory.

Furthermore, matching the number of print columns per line is described above as one way of achieving the same or substantially the same printout, but the invention is not so limited. For example, printout with the same or substantially the same appearance can be produced by adjusting to the same or approximately the same values settings in the settings file 26 such as the number of columns per unit length in the row direction of the thermal roll paper, the size of the margins widthwise to the thermal roll paper, the size of the space between characters, and the size of the space between lines. In this configuration the information contained in the INF file 27 and MOT file 28 of the settings file 26 is not limited to the actual font size and font data as described above, and may contain other types of information, and a configuration that stores a different type of settings file correlated to the INF file 27 and MOT file 28 is also conceivable.

The printer 4 in the foregoing embodiment is described as using thermal roll paper as the recording medium by way of example, but the invention is not so limited and may use fanfold paper that is folded in pages of a specific length, or cut-sheet paper of a regular size.

Furthermore, the printer 4 in the foregoing embodiment is described as a thermal printer that prints on thermal roll paper by means of a line thermal head having a heating element, but the invention is not so limited. More particularly, the recording device to which the invention can be applied includes any type of printer that can print previously stored image data, including dot impact printers, inkjet printers, and laser printers. The invention can also be applied to printers that are incorporated into other devices.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording control device that is connected to a recording device that stores recording format information specifying a text recording format including font data and records text at a specified character size according to the recording format information, the recording control device comprising:
- a control unit configured to control recording operation of the recording device;
- a configuration unit configured to configure control unit settings that are related to the text recording format of the recording device and are used by the control unit to control the recording device; and
- a storage unit configured to store at least one set of recording device settings data and control device settings data correlated to obtain the same or substantially the same recording result as a recording device having a different print resolution;
- wherein the recording device settings data contains font data and information specifying the size of text, and the control device settings data contains information setting font and size of text to the recording device by the configuration unit; and the configuration unit is configured to acquire the recording device settings data and the control device settings data from the storage unit, configure the control unit settings based on the acquired control device settings data, and generate or update the recording format information stored in the recording device based on the recording device settings data.

2. The recording control device described in claim 1, wherein:
- the configuration unit acquires the recording device settings data and the control device settings data from the storage unit, updates or generates the recording format information of the recording device based on the acquired recording device settings data by executing a firmware setup program, and sets the configuration unit based on the control device settings data by executing a printer driver.

3. The recording control device described in claim 2, wherein:
- the control unit generates is configured to generate a print job for recording at the character size set by the configuration unit based on the operation of an application program.

4. The recording control device described in claim 1, wherein:
- the recording device is a device that records characters composed of a plurality of dots by forming dots on a recording medium;
- the recording device settings data and the control device settings data include information specifying a recording dot size of the characters so that the recording device can record text with the same or substantially the same arrangement as a separate recording device with a different recording resolution; and
- the configuration unit sets is configured to set, for the control unit, the recording dot size of characters recorded by the recording device or a character size obtained from the recording resolution of the recording device and the recording dot size of the characters.

5. The recording control device described in claim 4, wherein:
- the control unit generates is configured to generate a print job for recording at the character size set by the configuration unit based on the operation of an application program.

6. A control method that controls a recording control device, the recording control device being connected to a recording device that stores recording format information specifying a text recording format including font data and records text at a specified character size according to the recording format information, and including a control unit that controls a recording operation of the recording device, the control method comprising steps of:
- acquiring a set of recording device settings data and control device settings data correlated to obtain the same or substantially the same recording result as a recording device with different print resolution, wherein the recording device settings data contains font data and information specifying the size of text, and the control device settings data contains information setting font and size of text to the recording device by the configuration unit;
- configuring settings that are related to the text recording format of the recording device and are used by the control unit to control the recording device based on the acquired control device settings data; and
- generating or updating the recording format information stored in the recording device based on the recording device settings data.

7. A program At least one tangible computer-readable storage medium storing computer-executable instructions that, when executed by a processor of a control device that is connected to a recording device that stores recording format information specifying a text recording format including font data and records text at a specified character size according to the recording format information, and includes a control unit that controls a recording operation of the recording device, perform a method comprising steps of:
- acquiring a set of recording device settings data and control device settings data correlated to obtain the same or substantially the same recording result as a recording device with different print resolution, wherein the recording device settings data contains font data and information specifying the size of text, and the control device settings data contains information setting font and size of text to the recording device by the configuration unit;
- configuring settings that are related to the text recording format of the recording device and are used by the control unit to control the recording device based on the acquired control device settings data; and
- generating or updating the recording format information stored in the recording device based on the recording device settings data.

* * * * *